United States Patent
Murata

(10) Patent No.: US 8,991,342 B2
(45) Date of Patent: Mar. 31, 2015

(54) VARIABLE VALVE DEVICE FOR INTERNAL COMBUSTION ENGINE

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1182 days.

(21) Appl. No.: 12/940,094

(22) Filed: Nov. 5, 2010

(65) Prior Publication Data

US 2011/0107992 A1 May 12, 2011

(30) Foreign Application Priority Data

Nov. 6, 2009 (JP) ................................. 2009-254910

(51) Int. Cl.
*F01L 1/34* (2006.01)
*F01L 1/047* (2006.01)
*F01L 1/344* (2006.01)
*F02D 13/02* (2006.01)
*F02D 41/00* (2006.01)

(52) U.S. Cl.
CPC . *F01L 1/34* (2013.01); *F01L 1/047* (2013.01); *F01L 1/344* (2013.01); *F01L 2001/0473* (2013.01); *F01L 2001/34489* (2013.01); *F01L 2001/34493* (2013.01); *F01L 2800/00* (2013.01); *F02D 13/0238* (2013.01); *F02D 13/0257* (2013.01); *F02D 41/0002* (2013.01); *F02D 2041/001* (2013.01); *Y02T 10/42* (2013.01); *Y02T 10/18* (2013.01)
USPC ....................................................... 123/90.17

(58) Field of Classification Search
CPC ............ F02D 13/0238; F02D 13/0257; F02D 41/0002; F01L 1/34; F01L 1/344; F01L 1/047; F01L 2001/34493; F01L 2800/00; F01L 2001/0473; F01L 2001/34489
USPC ................................. 123/90.15, 90.17, 90.31
See application file for complete search history.

(56) References Cited

U.S. PATENT DOCUMENTS

2005/0257762 A1* 11/2005 Sawada ...................... 123/90.17
2007/0272183 A1 11/2007 Schneider
2009/0145380 A1 6/2009 Wada et al.

FOREIGN PATENT DOCUMENTS

| DE | 102005039751 A1 | 3/2007 |
|---|---|---|
| EP | 0582846 A1 | 8/1994 |
| GB | 2 369 175 A | 5/2002 |

(Continued)

OTHER PUBLICATIONS

European Office Action mailed Jan. 19, 2012.

*Primary Examiner* — Zelalem Eshete
(74) *Attorney, Agent, or Firm* — Birch, Stewart, Kolasch & Birch, LLP

(57) ABSTRACT

A variable valve device for an internal combustion engine includes a first cam phase variable mechanism capable of varying the phases of both first and second intake cams by using operating oil pressure, and a second cam phase variable mechanism having a split change function and capable of varying the phase of the second intake cam relative to that of the first intake cam by using the operating oil pressure. When the engine is operating in a low-speed, low-load region (A) in which the engine rotating speed is lower than a predetermined rotating speed ($N_2$) and at the same time the engine load is lower than a predetermined load ($L_1$), the second cam phase variable mechanism is preferentially controlled over the first cam phase variable mechanism.

3 Claims, 11 Drawing Sheets

(56) References Cited

FOREIGN PATENT DOCUMENTS

| JP | 2004-176672 A | 6/2004 |
| JP | 2009-144521 A | 7/2009 |
| JP | 2009-221867 A | 10/2009 |
| JP | 2009-228640 A | 10/2009 |
| WO | WO 2007/022737 A1 | 3/2007 |
| WO | WO 2008/087539 A2 | 7/2008 |

* cited by examiner

VARIABLE VALVE DEVICE FOR INTERNAL COMBUSTION ENGINE

BACKGROUND OF THE INVENTION

1. Field of the Invention

The present invention relates to a variable valve device for internal combustion engines, and more particularly, to techniques for optimizing valve opening/closing timings of intake and exhaust valves.

2. Description of the Related Art

In recent years, more and more internal combustion engines (engines) have come to be equipped with cam phase variable mechanisms as a variable valve device for varying valve opening/closing timings (cam phases). Also, techniques have been developed whereby the cam phase variable mechanisms are applied to an engine having each cylinder provided with a plurality of intake valves and the valve opening/closing timings of all intake valves as well as only some of the intake valves are varied (split) in accordance with the operating condition of the engine (Japanese Laid-open Patent Publication No. 2009-144521).

Where the valve opening/closing timings of only some of the intake valves associated with the individual cylinders can be varied in this manner, the multiple intake valves can be made to open continuously as a whole, whereby highly flexible valve control can be executed so that the overall valve open period of the intake valves may be prolonged, making it possible to improve the operational performance of the engine.

As actuators for such cam phase variable mechanisms, hydraulic actuators operated by unit of operating oil pressure are generally used. Also in the aforementioned publication, a vane-type hydraulic actuator is used for an actuator for actuating all of the intake valves as well as for an actuator for actuating only some of the intake valves.

Where a plurality of hydraulic actuators are used, however, a problem arises in that when the operating oil pressure is supplied to both of the hydraulic actuators at the same time, the supply pressure of the operating oil fluctuates due to temporary drop in the overall operating oil pressure. Such fluctuation in the supply pressure of the operating oil is not desirable because the valve opening/closing timings (cam phases) possibly fail to be accurately controlled as a result.

SUMMARY OF THE INVENTION

An object of the present invention is to provide a variable valve device for an internal combustion engine which is capable of precisely controlling cam phases, thereby improving operational performance of the engine.

To achieve the object, the present invention provides a variable valve device for an internal combustion engine comprising: a first cam phase variable mechanism in which each cylinder includes a first intake valve driven by a first intake cam and a second intake valve driven by a second intake cam, the mechanism being capable of varying phases of both the first and second intake cams, a second cam phase variable mechanism capable of varying the phase of the second intake cam relative to that of the first intake cam, and a phase variable control unit that controls the first and second cam phase variable mechanisms, wherein the phase variable control unit preferentially controls one of the first and second cam phase variable mechanisms over the other in accordance with an operating condition of the engine.

Thus, the variable valve device for an internal combustion engine is provided with the first cam phase variable mechanism capable of varying the phases of both the first and second intake cams by using operating oil pressure, and also with the second cam phase variable mechanism having a split change function and capable of retarding the phase of the second intake cam relative to that of the first intake cam by using the operating oil pressure, and one of the first and second cam phase variable mechanisms is preferentially controlled over the other in accordance with the operating condition of the engine. Accordingly, the first or second cam phase variable mechanism can be stably controlled in accordance with the operating condition of the engine, so that the phase of the first or second intake cam can be controlled with high precision to improve the output of the engine and also reduce the fuel cost, making it possible to improve the operational performance of the engine.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the accompanying drawings.

A first embodiment will be explained first.

Figure 1:
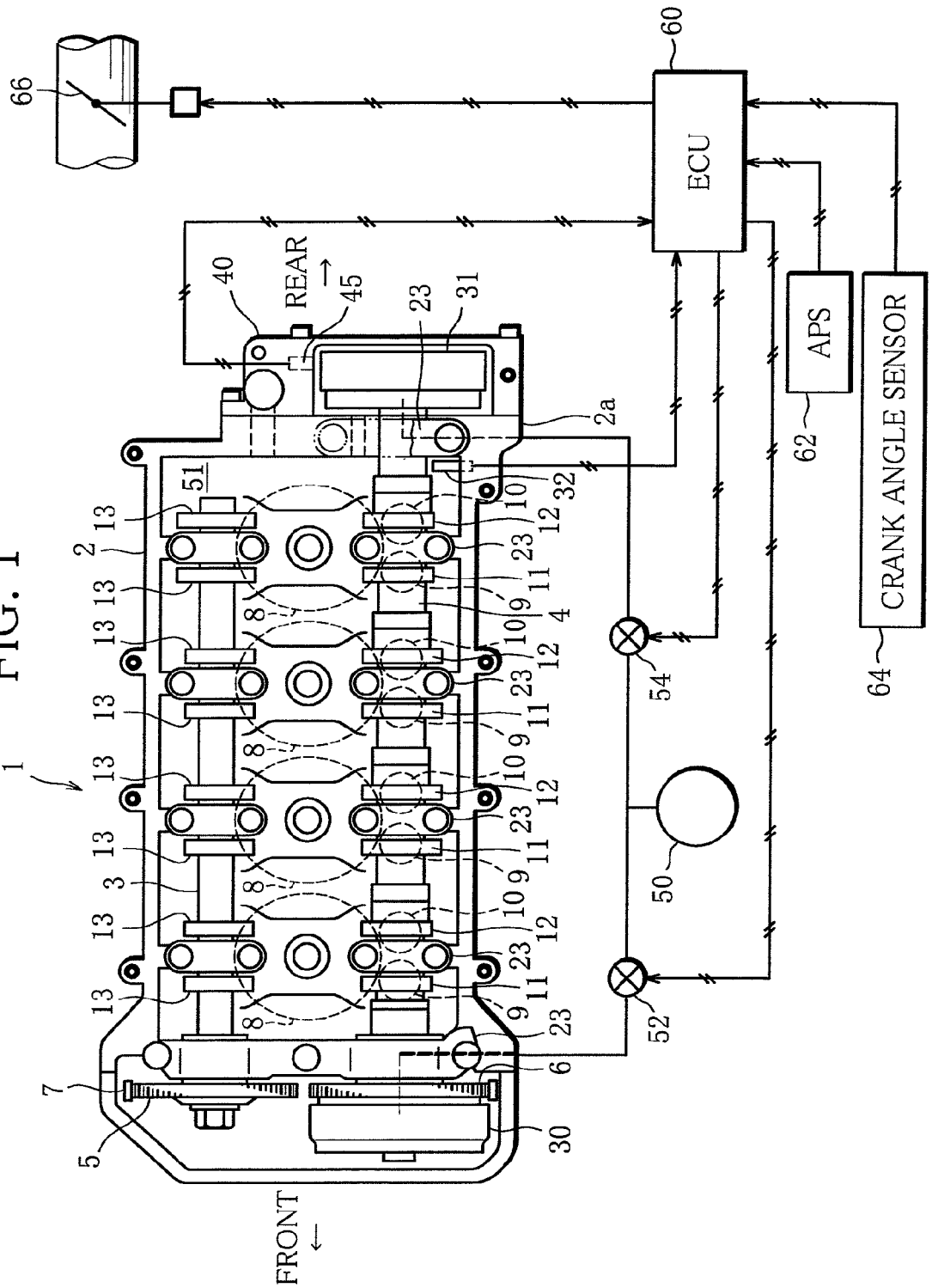
FIG. 1 illustrates a schematic construction of a variable valve device for an internal combustion engine according to the present invention.

FIG. 1 schematically illustrates the construction of a variable valve device for an internal combustion engine according to the present invention. More particularly, FIG. 1 is a top view showing the internal structure of a cylinder head 2 of an engine 1.

The engine 1 is an in-line four-cylinder engine with a DOHC valve train, for example. As shown in FIG. 1, cam sprockets 5 and 6 are connected to exhaust and intake camshafts 3 and 4, respectively, rotatably supported inside the cylinder head 2, and are also coupled to a crankshaft, not shown, by a chain 7.

Each cylinder 8 of the engine 1 is provided with two intake valves 9 and 10 and two exhaust valves, not shown. The two intake valves 9 and 10 are actuated by first and second intake cams 11 and 12, respectively, which are alternately arranged on the intake camshaft 4. Specifically, out of the two intake valves, the first intake valve 9 is actuated by the first intake cam 11, and the second intake valve 10 by the second intake cam 12. The two exhaust valves, on the other hand, are actuated by respective exhaust cams 13 fixed on the exhaust camshaft 3.

The intake camshaft 4 has a double structure comprising a hollow outer camshaft and an inner camshaft inserted through the outer camshaft. The outer and inner camshafts are coaxially arranged with some gap therebetween and are rotatably supported by a plurality of cam journals 23 formed on the cylinder head 2 of the engine 1.

The first intake cams 11 are fixed on the outer camshaft, while the second intake cams 12 are rotatably supported on the outer camshaft. The second intake cams 12 are fixed to the inner camshaft by fixing pins fitted through circumferentially elongated holes formed through the outer camshaft. Consequently, the first intake cams 11 are driven by rotation of the outer camshaft, while the second intake cams 12 are driven by rotation of the inner camshaft.

The intake camshaft 4 is provided with a first cam phase variable mechanism 30 and a second cam phase variable mechanism 31. For each of the first and second cam phase variable mechanisms 30 and 31, a vane-type hydraulic actuator conventionally known in the art is used, for example. The vane-type hydraulic actuator includes a cylindrical housing (cover) and a vane rotor rotatably arranged in the housing, and has the function of varying the rotational angle of the vane relative to the housing in accordance with the amount of operating oil supplied to the interior of the housing from a hydraulic unit 50 via a solenoid-operated hydraulic valve 52, 54, namely, in accordance with the operating oil pressure.

The first cam phase variable mechanism 30 is attached to the front end of the intake camshaft 4 with the housing fixed to the cam sprocket 6 and with the vane rotor fixed to the outer camshaft.

The second cam phase variable mechanism 31 is attached to the rear end of the intake camshaft 4, and the outer and inner camshafts are fixed, respectively, to the housing and the vane rotor of the second cam phase variable mechanism 31.

Because of the construction described above, the first cam phase variable mechanism 30 provides the function of varying the rotational angle of the outer camshaft relative to the cam sprocket 6, while the second cam phase variable mechanism 31 provides the function of varying the rotational angle of the inner camshaft relative to the outer camshaft. Specifically, the first cam phase variable mechanism 30 has the function of varying the valve opening/closing timing of the first and second intake valves 9 and 10 as a whole with respect to the valve opening/closing timing of the exhaust valves, and the second cam phase variable mechanism 31 has a split change function, namely, the function of varying a phase difference (amount of split) between the valve opening/closing timings of the first and second intake valves 9 and 10.

A first cam sensor 32 for detecting an actual rotational angle of the outer camshaft is mounted to the cylinder head 2. In accordance with information from the first cam sensor 32, the opening of the hydraulic valve 52 is adjusted so as to control the operation of the first cam phase variable mechanism 30.

The rear end of the intake camshaft 4 penetrates through a rear wall 2a of the cylinder head 2, and thus the second cam phase variable mechanism 31 is located outside the cylinder head 2. The second cam phase variable mechanism 31 is covered with an actuator cover 40.

To the actuator cover 40 is mounted a second cam sensor 45, which detects the rotation timing of the vane rotor of the second cam phase variable mechanism 31 to detect an actual rotational angle of the inner camshaft.

Accordingly, an actual rotational angle difference between the inner and outer camshafts can be detected from the information provided by the first and second cam sensors 32 and 45, and the opening of the solenoid-operated hydraulic valve 54 is adjusted on the basis of the actual rotational angle difference, whereby the operation of the second cam phase variable mechanism 31 can be controlled.

An electronic control unit (ECU) 60 is a controller for performing various control operations on the engine 1 and comprises a CPU, memories, and so forth. Various sensors including an accelerator position sensor (APS) 62 for detecting the position of an accelerator of the engine 1 and a crank angle sensor 64 for detecting the crank angle of the engine 1, besides the first and second cam sensors 32 and 45, are connected to the input side of the ECU 60. Various devices including a throttle valve 66 arranged in the intake passage of the engine 1 for adjusting the amount of intake air, in addition to the solenoid-operated hydraulic valves 52 and 54, are connected to the output side of the ECU 60. Based on information about the accelerator position detected by the APS 62, engine load is detected, and based on information about the crank angle detected by the crank angle sensor 64, engine rotating speed Ne is detected.

The following describes the operation of the variable valve device of the first embodiment of the present invention configured in the manner described above.

Figure 2:
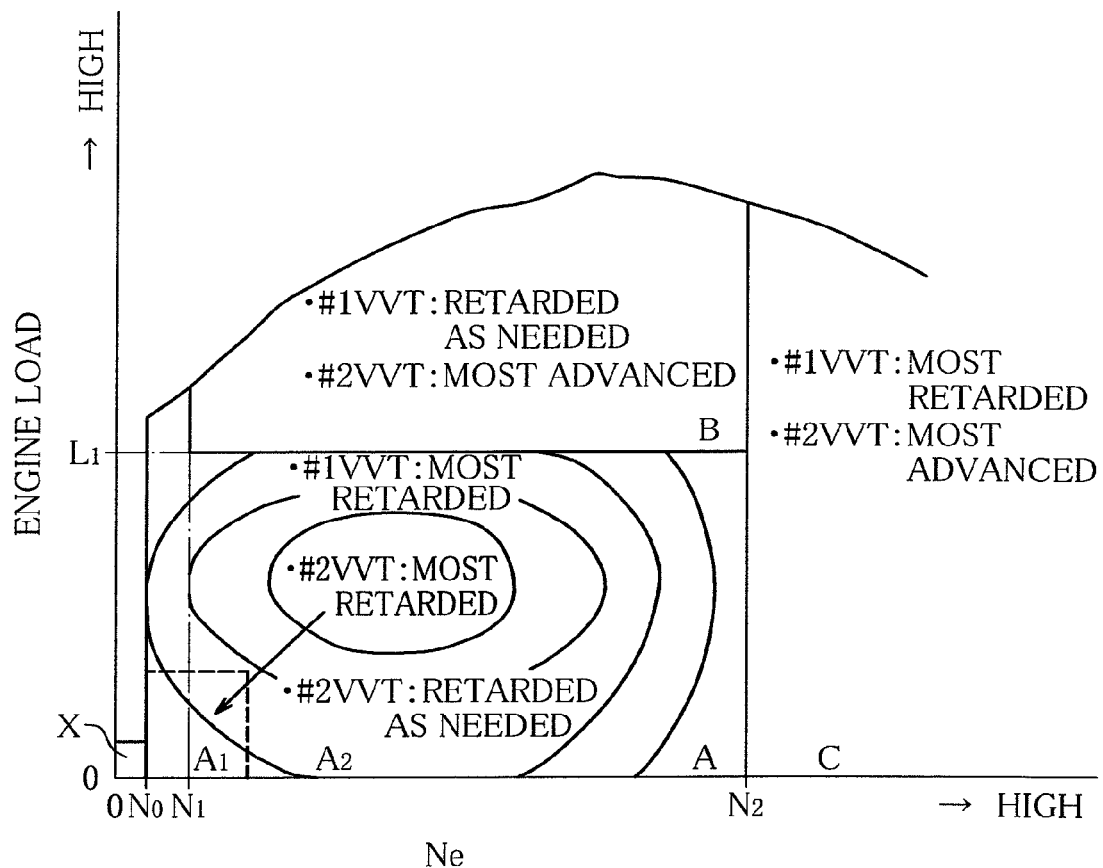
FIG. 2 illustrates a map used for controlling the operations of first and second cam phase variable mechanisms according to a first embodiment.

The operation of the first and second cam phase variable mechanisms 30 and 31 is controlled by the ECU 60 in accordance with a map illustrated in FIG. 2, that is, in accordance with the operating condition of the engine 1 represented by the engine load and the engine rotating speed Ne (phase variable control unit).

As seen from the map of FIG. 2, the operation control of the first and second cam phase variable mechanisms 30 and 31 is executed with the engine operating condition classified into four regions which include a region X in which the engine 1 is started and warmed up, a region A (low-speed, low-load region) in which the engine load and the engine rotating speed Ne are both low, a region B (high-load region) in which the engine load is high but the engine rotating speed Ne is low, and a region C (high-speed region) in which the engine rotating speed Ne is high.

In the region X corresponding to the start and warm-up of the engine 1, the oil pressure supplied from the hydraulic unit 50 is not sufficiently high. Accordingly, the first cam phase variable mechanism (in FIG. 2, indicated by "1ST VVT") 30 is held at the most retarded position, and the second cam phase variable mechanism (in FIG. 2, indicated by "2ND VVT") 31 has its phase kept at the most advanced position by a locking pin.

In the region A, the first cam phase variable mechanism 30 is controlled to the most retarded position while the second cam phase variable mechanism 31 is controlled to an appropriate phase on the basis of the accelerator position information from the APS 62, as distinct from the region X corresponding to the start and warm-up of the engine 1. Specifically, when the engine rotating speed Ne is equal to or higher than a predetermined value $N_0$ and at the same time is lower than a predetermined value $N_1$, the oil pressure supplied from the hydraulic unit 50 is still not sufficiently high, and thus the second cam phase variable mechanism 31 is comparatively higher in controllability than the first cam phase variable mechanism 30, because the second cam phase variable mechanism 31 is configured to vary the phase of a fewer valves than the first cam phase variable mechanism 30. Accordingly, the first cam phase variable mechanism 30 is kept at the phase determined by the locking pin or is controlled to the most retarded position by the oil pressure, while the second cam phase variable mechanism 31 is controlled to an arbitrary phase. Also, while the engine load is lower than a predetermined value $L_1$ and the engine rotating speed Ne is equal to or higher than the predetermined value $N_1$ and at the same time is lower than a predetermined value $N_2$, the first cam phase variable mechanism 30 is controlled to the most retarded position and the second cam phase variable mechanism 31 is controlled to an appropriate phase.

In the region B, the first cam phase variable mechanism 30 is controlled to an appropriately retarded position while the second cam phase variable mechanism 31 is controlled to the most advanced position. Specifically, when the engine load indicated by the accelerator position information from the APS 62 is equal to or higher than the predetermined value $L_1$ and the engine rotating speed Ne is higher than or equal to the predetermined value $N_1$ and at the same time is lower than the predetermined value $N_2$, the first cam phase variable mechanism 30 is controlled to an appropriately retarded position and the second cam phase variable mechanism 31 is controlled to the most advanced position.

In the region C, the first cam phase variable mechanism 30 is controlled to the most retarded position while the second cam phase variable mechanism 31 is controlled to the most advanced position, as in the region X. Specifically, when the engine rotating speed Ne is equal to or higher than the predetermined value $N_2$, the first cam phase variable mechanism 30 is controlled to the most retarded position and the second cam phase variable mechanism 31 is controlled to the most advanced position.

Thus, in the region A in which the engine load and the engine rotating speed Ne are both low, the second cam phase variable mechanism 31 is preferentially controlled with the first cam phase variable mechanism 30 fixed at the most retarded position. On the other hand, in the region B in which the engine load is high but the engine rotating speed Ne is low, the first cam phase variable mechanism 30 is preferentially controlled with the second cam phase variable mechanism 31 fixed at the most advanced position. In the region C in which the engine rotating speed Ne is high, such preference control is stopped and the first and second cam phase variable mechanisms 30 and 31 are fixed at the most retarded and advanced positions, respectively.

In this manner, where one of the first and second cam phase variable mechanisms 30 and 31 is controlled with the other fixed, the operating oil pressure has only to be supplied to at least one of the first and second cam phase variable mechanisms 30 and 31, without being simultaneously supplied to both of the first and second cam phase variable mechanisms 30 and 31. Consequently, fluctuations in the supply pressure of the operating oil can be suppressed in all of the regions A, B and C, whereby both of the first and second cam phase variable mechanisms 30 and 31 can be stably controlled with high accuracy.

Accordingly, the first and second intake valves 9 and 10 can be continuously and smoothly operated as desired to increase the overall valve open period, and it is possible to satisfactorily lower the pumping loss of the engine 1 while precisely controlling the intake manifold pressure, whereby the engine output can be improved and the fuel cost reduced.

Meanwhile, in the region A in which the engine load and the engine rotating speed Ne are both low, the second cam phase variable mechanism 31 is controlled in such a manner that the mechanism 31 is controlled to the most retarded position in the central portion of the region A and is gradually advanced to an appropriately retarded position as the control point moves toward the peripheral portion of the region A away from the central portion, as indicated by the arrow.

Also, as indicated by the dashed line in FIG. 2, the region A is subdivided into a region $A_1$ in which both the engine load and the engine rotating speed Ne are extremely low, and the remaining region $A_2$. The region $A_1$ denotes a post-warm-up extremely-low-speed, extremely-low-load region including a hot idling region, and the region $A_2$ denotes an ordinary low-speed, low-load region.

The extremely-low-speed, extremely-low-load region $A_1$ is situated in the peripheral portion of the region A distant from the central portion. Thus, in the extremely-low-speed, extremely-low-load region $A_1$, the first cam phase variable mechanism 30 is controlled to the most retarded position while the second cam phase variable mechanism 31 is not controlled to the most retarded position but is advanced to an appropriately retarded position, as stated above.

Figure 3A:
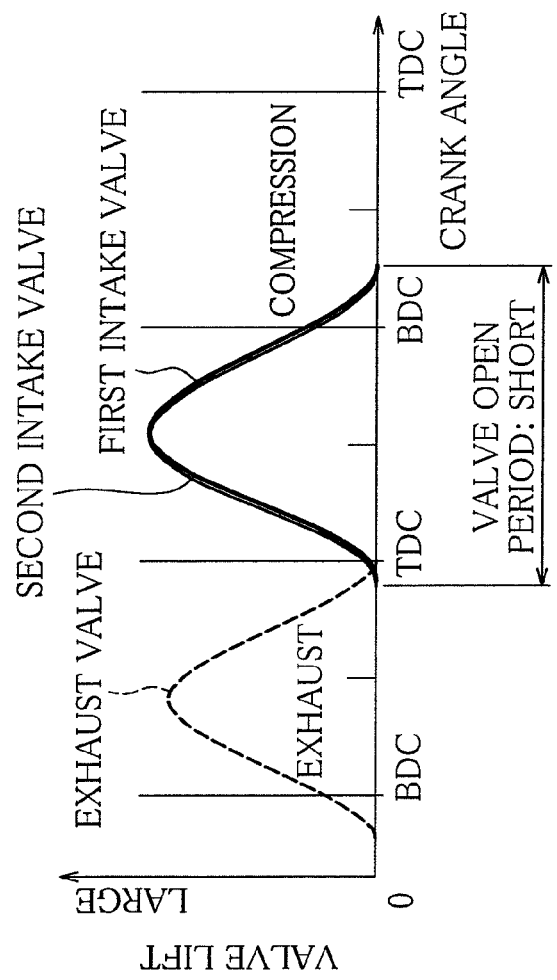
FIGS. 3(a), 3(b) and 3(c) individually illustrate the relationship of the crank angle of the engine with the lift amounts of first and second intake valves and an exhaust valve during the execution of operation control in a low-speed, low-load region.
Figure 3B:
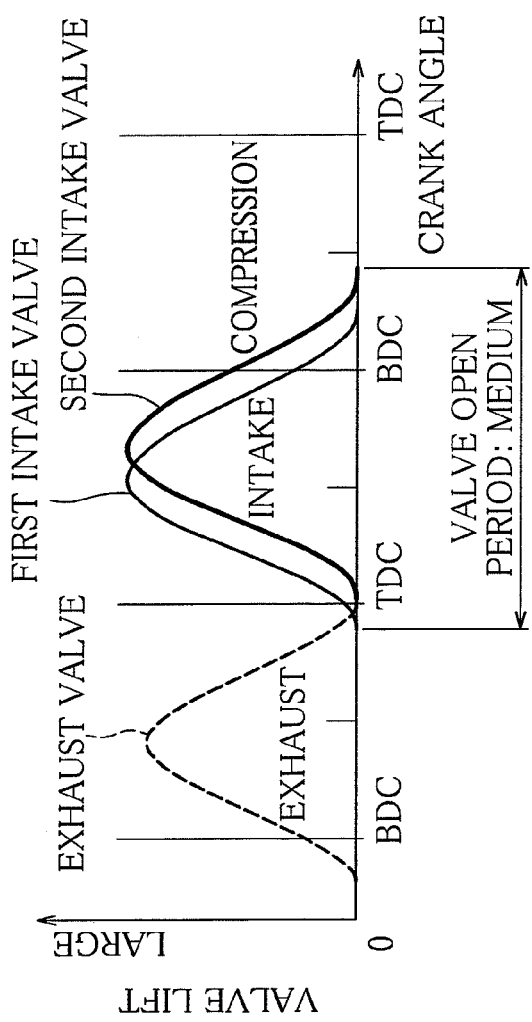
Figure 3C:
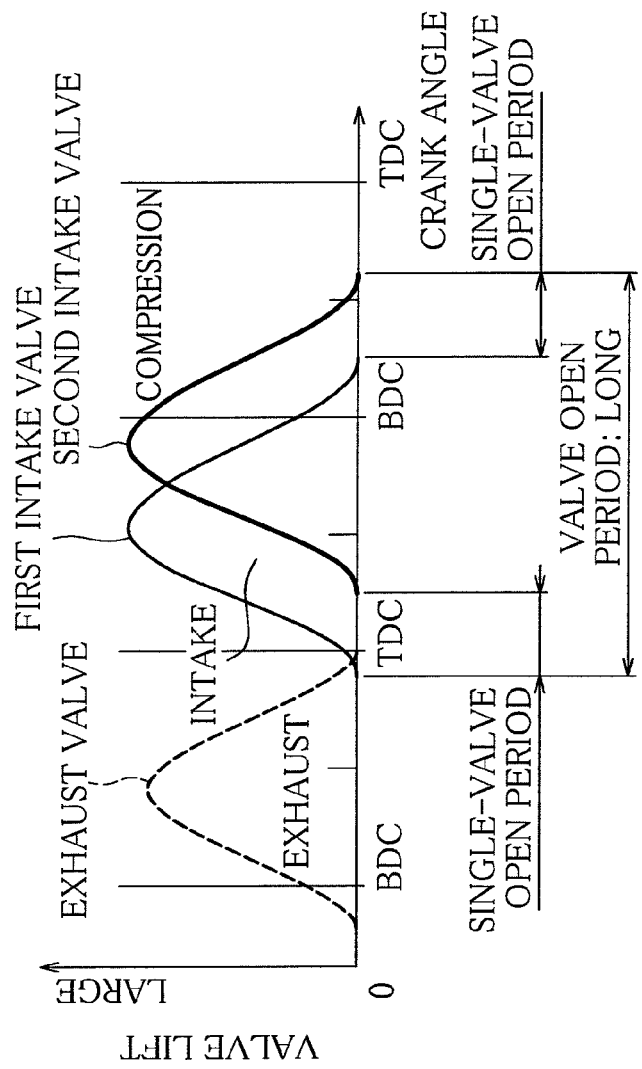

Referring now to FIGS. 3(*a*), 3(*b*) and 3(*c*), there are illustrated the relationships of the crank angle of the engine 1 with the valve lift amounts of the first and second intake valves 9 and 10 and the exhaust valve during the execution of the operation control in the region A. FIG. 3(*a*) indicates the case where the second cam phase variable mechanism 31 is controlled to the most advanced position to advance the valve closing timing of the second intake valve 10 so as to coincide with that of the first intake valve 9, as in the region X corresponding to the start and warm-up of the engine 1, for example, thereby increasing the actual compression ratio to enhance the ignition performance and thus the combustion stability. FIG. 3(*b*) indicates the case where the second cam phase variable mechanism 31 is controlled to an appropriately retarded position in the extremely-low-speed, extremely-low-load region $A_1$, to reduce the pumping loss by retarding the valve closing timing of the second intake valve, as well as to have the strengthened in-cylinder flow, caused by the shifted valve open periods of the first and second intake valves, balanced with the actual compression ratio dependent on the valve closing timing, so as to enhance the combustion stability and thereby improve the fuel consumption. FIG. 3(*c*) indicates the case where the second cam phase variable mechanism 31 is controlled to the most retarded position in the central portion of the region A (region $A_2$), to maximize the amount of split, that is, the phase difference between the valve opening/closing timings of the first and second intake valves 9 and 10, thereby minimizing the actual compression ratio by the retarded valve closing timing of the second intake valve, as well as the pumping loss, to strengthen the in-cylinder flow and thereby improve the fuel consumption.

Thus, in the extremely-low-speed, extremely-low-load region $A_1$, the second cam phase variable mechanism 31 is controlled not to the most retarded position but to an appropriately retarded position for the following reason: It was experimentally confirmed that if the second cam phase variable mechanism 31 is controlled to the most retarded position in the extremely-low-speed, extremely-low-load region to maximize the amount of split between the first and second intake valves 9 and 10, the combustion stability deteriorates instead of improving, so that the fuel consumption tends to lower correspondingly.

Figure 4:
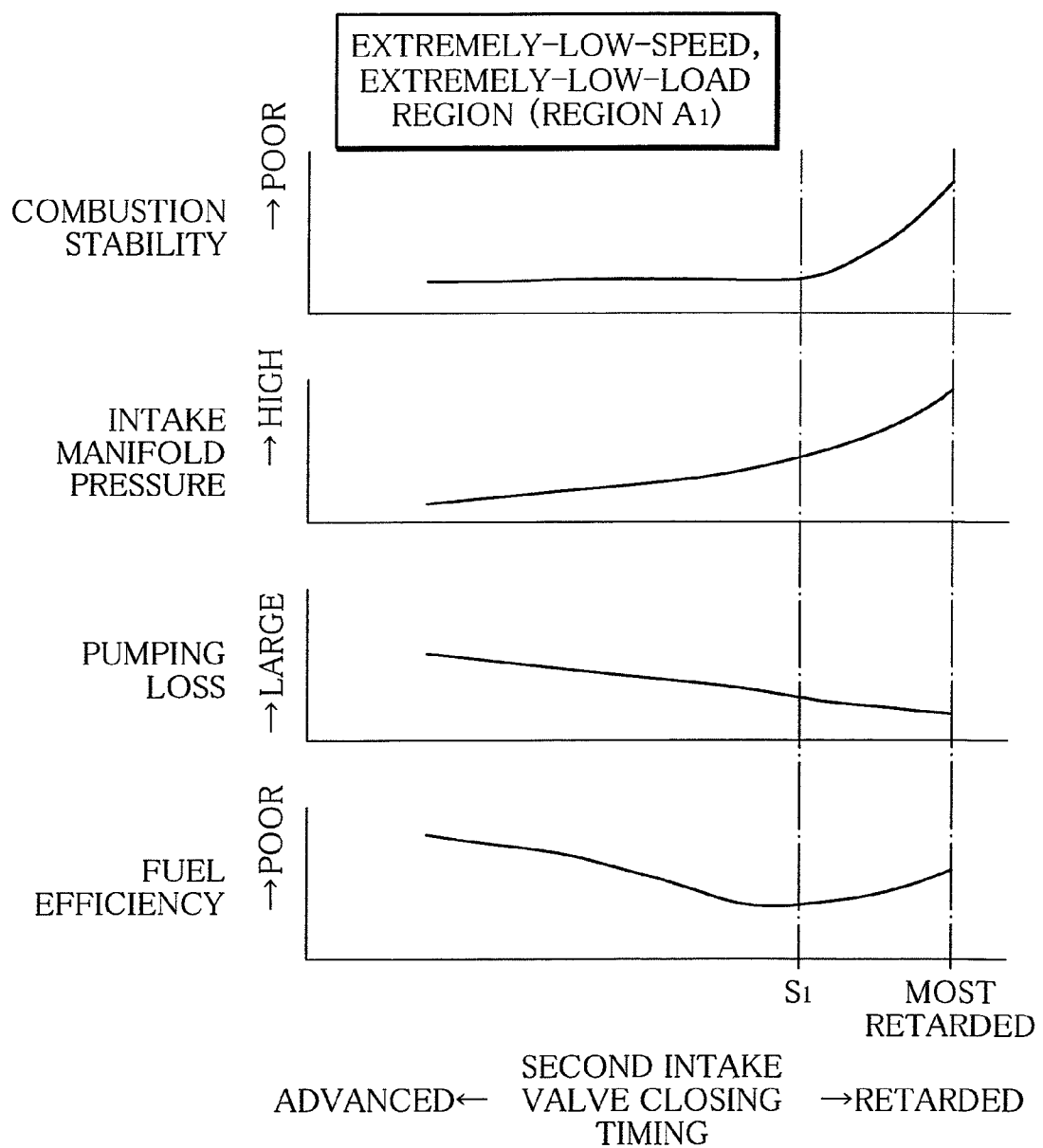
FIG. 4 illustrates the relationship of the valve closing timing of the second intake valve with combustion stability, intake manifold pressure, pumping loss, and fuel consumption.

Referring now to FIG. 4, there is illustrated the relationship of the valve closing Liming of the second intake valve 10 with the combustion stability, the pressure in the intake manifold (intake manifold pressure), the pumping loss and the fuel consumption, all based on experimental values. FIG. 4 reveals the following: By retarding the second cam phase variable mechanism 31 and thus the valve closing timing of the second intake valve 10, it is possible to satisfactorily lower the pumping loss while at the same time precisely controlling the intake manifold pressure, but as the combustion stability deteriorates, the fuel consumption deteriorates.

The reason why the combustion stability and the fuel consumption deteriorate as the second cam phase variable mechanism 31 is retarded in the extremely-low-speed, extremely-low-load region is presumably because, despite the pumping loss reducing effect, the combustion quality lowers due to reduction in the actual compression ratio, and also because the heat loss increases due to excessively strengthened in-cylinder flow.

Accordingly, in the extremely-low-speed, extremely-low-load region, the second cam phase variable mechanism 31 is controlled not to the most retarded position but to an appropriately retarded position, for example, to a position $S_1$ shown in FIG. 4 where the combustion stability and the fuel consumption are optimal, or to a position falling within a predetermined phase range including or close to the position $S_1$.

In addition, where the second cam phase variable mechanism 31 is controlled not to the most retarded position but to an appropriately retarded position such as the position $S_1$ in FIG. 4 where the combustion stability and the fuel consumption are optimal, or to a position falling within the predetermined phase range including or close to the position $S_1$, the throttle valve 66 is also controlled toward the closed position. This leads to increase in the intake manifold pressure and thus in the negative pressure in the combustion chamber, whereby the vaporization of fuel is promoted, making it possible to further improve the combustion stability.

Deterioration in the combustion stability and the fuel consumption, which is encountered when the second cam phase variable mechanism 31 is retarded in the extremely-low-speed, extremely-low-load region, is presumably caused also due to increased friction attributable to change in the state of lubrication of the intake camshaft 4 and the intake valves 9 and 10 lubricated by lubricating oil, as explained below.

Figure 5:
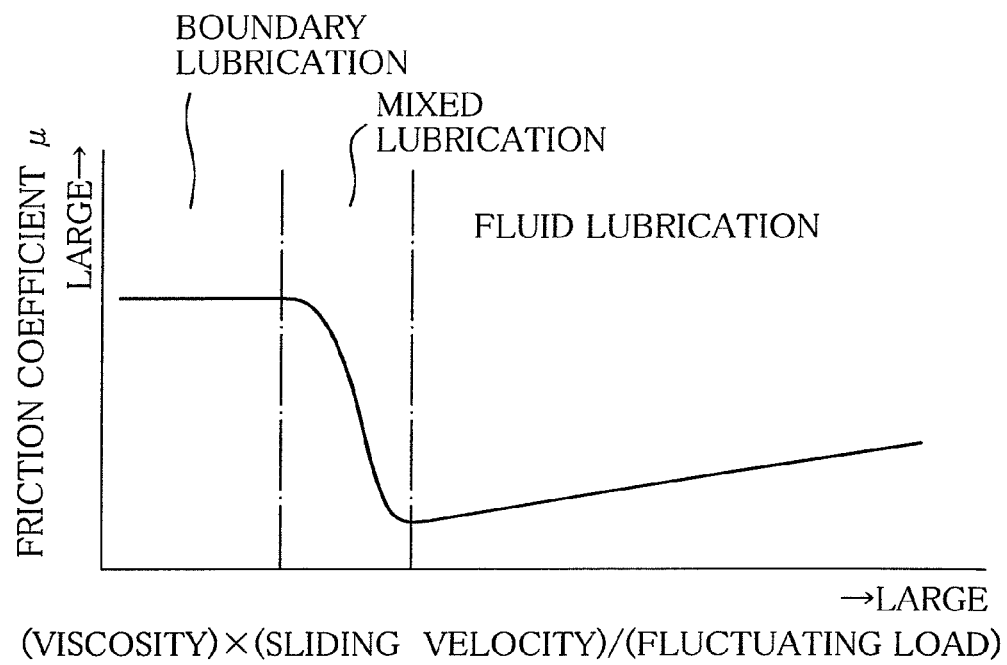
FIG. 5 is a Stribeck diagram.

Referring to FIG. 5, there is illustrated what is called a Stribeck diagram showing the relationship of the viscosity of lubricating oil, sliding velocity and fluctuating load ((viscosity)×(sliding velocity)/(fluctuating load)) with the state of lubrication. As seen from FIG. 5, the smaller the viscosity of the lubricating oil or the lower the sliding velocity or the larger the fluctuating load, the state of lubrication changes from fluid lubrication to mixed lubrication or further to boundary lubrication, with the result that the friction coefficient μ increases.

Figure 6:
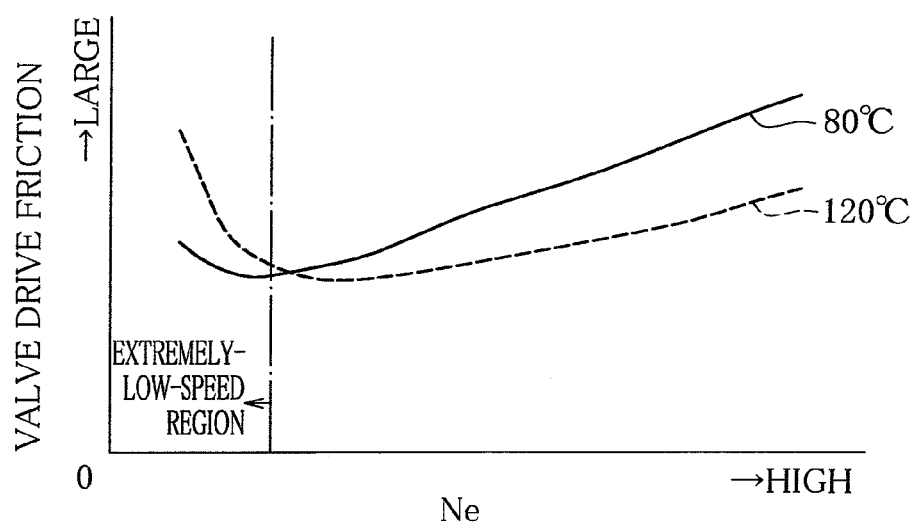
FIG. 6 illustrates the relationship of engine rotating speed Ne with valve drive friction and lubricating oil temperature.

As shown in FIG. 6, valve drive friction that resists valve actuation tends to increase as the engine rotating speed Ne becomes extremely low, and in the extremely-low-speed region, the valve drive friction increases with increase in the temperature of the lubricating oil and thus with decrease in the viscosity of the lubricating oil, exhibiting a property opposite to that of ordinary friction.

The influence of the property will be explained with reference to FIG. 5. In the post-warm-up extremely-low-speed region, the sliding velocity is low because of low rotating speed Ne of the engine, and therefore, the lubrication state is liable to fall within the boundary lubrication or mixed lubrication. Since the lubrication state is liable to shift to the boundary lubrication or mixed lubrication as the temperature of the lubricating oil increases and thus the viscosity of the lubricating oil decreases, the friction coefficient μ increases, with the result that the valve drive friction increases. Consequently, the fuel consumption further deteriorates.

Figure 7:
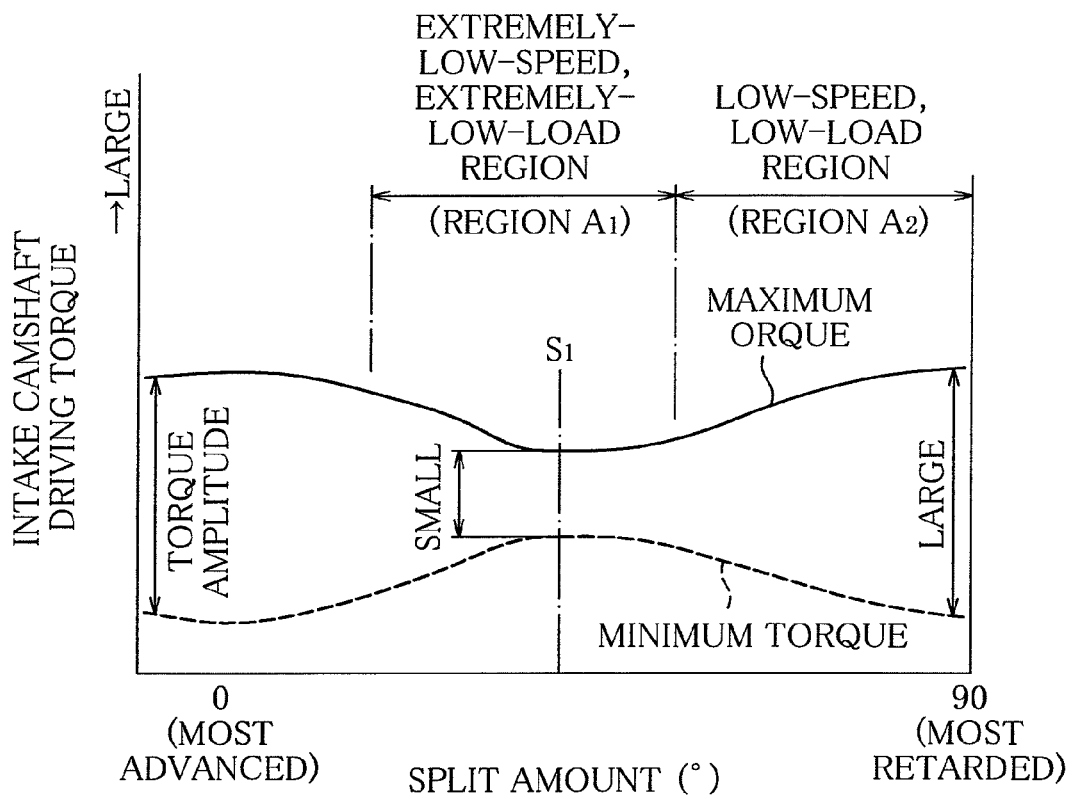
FIG. 7 illustrates the relationship of the amount of split between the first and second intake valves with torque applied to an intake camshaft.

In addition, the load required to drive the intake camshaft 4 is subject to fluctuation in the extremely-low-speed, extremely-low-load region. FIG. 7 illustrates the relationship between the intake camshaft driving torque applied to the intake camshaft 4 and the amount of split between the first and second intake valves 9 and 10, wherein the maximum torque indicated by the solid line and the minimum torque by the dashed line. FIG. 7 reveals that when the valve closing timing of the second intake valve 10 is set at the position $S_1$ where the amount of slip is not large, the maximum torque required to drive the intake camshaft 4 and the torque amplitude, that is, the fluctuating load, are smaller than when the valve closing timing is set at the most retarded position where the amount of split is large.

The phenomenon will be considered with reference to FIG. 5. In the most retarded position where the amount of split is large, the torque applied to drive the intake camshaft 4 is large, so that the fluctuating load is large. Accordingly, the lubrication state of the system for driving the intake camshaft 4 or of the parts supporting the rotating intake camshaft 4 is liable to become boundary lubrication or mixed lubrication, with the result that the friction coefficient μ increases, increasing the valve drive friction and deteriorating the fuel consumption. On the other hand, in the position $S_1$ where the split amount is not so large, the torque applied to drive the intake camshaft 4 is small, so that the fluctuating load is also small. Thus, the fluid lubrication is easily attained, and since the friction coefficient μ remains small, the valve drive friction is small, preventing deterioration in the fuel consumption.

Also for this reason, it is desirable that in the extremely-low-speed, extremely-low-load region, the second cam phase variable mechanism 31 should be controlled not to the most retarded position but to an appropriately retarded position which is advanced from the most retarded position, as stated above. For example, the second cam phase variable mechanism 31 is preferably controlled to the position $S_1$ in FIG. 4 where the combustion is stabilized because reduction in the pumping loss due to the retarded valve closing timing of the second intake valve 10 is balanced well with the strengthened in-cylinder flow, which is achieved by the shifted valve open periods of the first and second intake valves 9 and 10, as well as with the actual compression ratio dependent on the valve closing timing, and also the fuel consumption is optimized because the valve drive friction is small. The second cam phase variable mechanism 31 may also be controlled to a position falling within the predetermined phase range including or close to the position $S_1$. By controlling the second cam phase variable mechanism 31 in this manner, it is possible to balance reduction in the fuel cost with the operational performance of the engine 1 in the low-speed, low-load region, especially in the extremely-low-speed, extremely-low-load region.

FIG. 7 shows the case in which only the intake cam drive torque is driven. In a DOHC-type engine, however, both intake and exhaust cam drive torques are driven by crank. Moreover, in a V-type engine, cam drive torques are added up together to be driven by crank, and therefore, the second cam phase variable mechanism 31 may be controlled on the basis of the sum of the driving torques.

A second embodiment will be now described.

Figure 8:
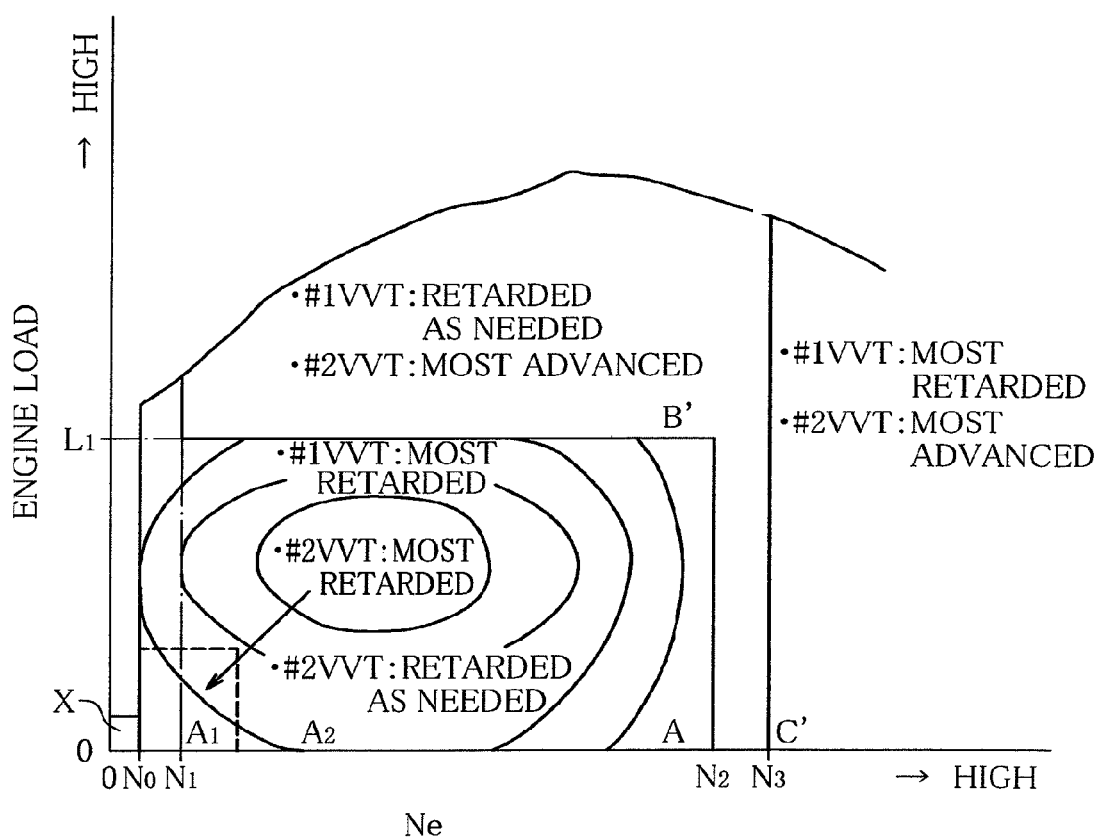
FIG. 8 illustrates a map used for controlling the operations of the first and second cam phase variable mechanisms according to a second embodiment.

The second embodiment differs from the first embodiment in that the first and second cam phase variable mechanisms 30 and 31 are controlled by using a map shown in FIG. 8, instead of the map shown in FIG. 2. In the following, therefore, only the differences between the first and second embodiments will be explained.

As seen from the map illustrated in FIG. 8, the operation control of the first and second cam phase variable mechanisms 30 and 31 is executed with the engine operating condition classified into the region X, which is identical with the region X shown in FIG. 2, the region A (low-speed, low-load region), which is identical with the region A shown in FIG. 2, a high-load or high-speed region B' (high-load or high-speed region) in which the engine load or the engine rotating speed Ne is high, and a higher-speed region C' in which the engine rotating speed Ne is still higher.

The regions X and A are identical with the those already explained above, and therefore, description thereof is omitted.

In the region B', the first cam phase variable mechanism 30 is controlled to an appropriately retarded position while the second cam phase variable mechanism 31 is controlled to the most advanced position. Specifically, when the engine load indicated by the accelerator position information from the APS 62 is higher than or equal to the predetermined value $L_1$ and at the same time the engine rotating speed Ne is higher than or equal to the predetermined value $N_1$ and lower than the predetermined value $N_2$, or when the engine rotating speed Ne is higher than or equal to the predetermined value N2 and lower than a predetermined value $N_3$, the first cam phase variable mechanism 30 is controlled to an appropriately retarded position and the second cam phase variable mechanism 31 is controlled to the most advanced position.

On the other hand, in the region C', the first cam phase variable mechanism 30 is controlled to the most retarded position while the second cam phase variable mechanism 31 is controlled to the most advanced position, as in the aforementioned region X. Specifically, when the engine rotating speed Ne is higher than or equal to the predetermined value $N_3$, the first cam phase variable mechanism 30 is controlled to the most retarded position and the second cam phase variable mechanism 31 is controlled to the most advanced position.

Thus, also in the second embodiment, in the region A in which the engine load and the engine rotating speed Ne are both low, the second cam phase variable mechanism 31 is preferentially controlled with the first cam phase variable mechanism 30 fixed at the most retarded position. In the region B' in which the engine load is high or the engine rotating speed Ne is high, the first cam phase variable mechanism 30 is preferentially controlled with the second cam phase variable mechanism 31 fixed at the most advanced position. In the region C' in which the engine rotating speed Ne is still higher, such preference control is stopped and the first and second cam phase variable mechanisms 30 and 31 are fixed at the most retarded and advanced positions, respectively.

Consequently, like the first embodiment, fluctuations in the supply pressure of the operating oil can be suppressed in all of the regions A, B' and C', thus permitting stable and accurate control of both the first and second cam phase variable mechanisms 30 and 31.

Thus, also in the second embodiment, the first and second intake valves 9 and 10 can be continuously and smoothly operated as desired to increase the overall valve open period, and it is possible to satisfactorily lower the pumping loss of the engine 1 while precisely controlling the intake manifold pressure, whereby the engine output can be improved and the fuel cost reduced.

In the description of the foregoing embodiments, it is stated that a vane-type hydraulic actuator conventionally known in the art, for example, is used for each of the first and second cam phase variable mechanisms 30 and 31. The cam phase variable mechanism to be used in the present invention is, however, not limited to a specific type, and a solenoid-operated actuator, for example, may be used instead.

Figure 9:
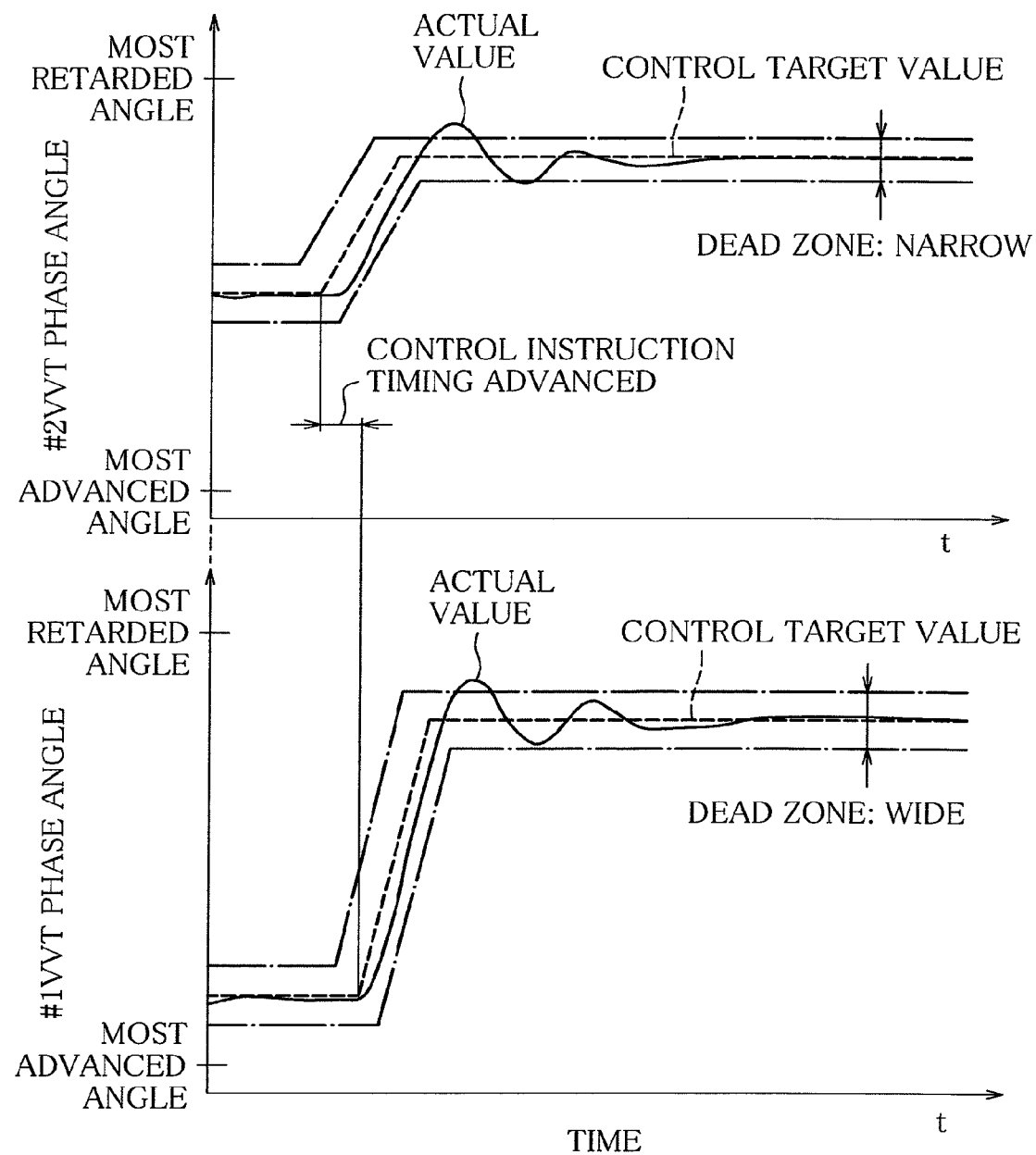
FIG. 9 illustrates the relationship of control preference between the first and second cam phase variable mechanisms.

The mode of the preference control is also not limited to the aforementioned control mode in which, with one of the first and second cam phase variable mechanisms 30 and 31 controlled to a fixed phase of the most advanced or retarded angle, the other is preferentially subjected to variable control. FIG. 9 illustrates the relationship of control preference between the first cam phase variable mechanism (in FIG. 9, indicated by "1ST VVT") 30 and the second cam phase variable mechanism (in FIG. 9, indicated by "2ND VVT") 31. As seen from the control preference relationship illustrated in FIG. 9, the two cam phase variable mechanisms 30 and 31 may be controlled to respective intermediate phases (control target values) set by target value setting means with their allowable deviation widths, or dead zones, set by dead zone setting means in such a manner that the dead zone for one of the two cam phase variable mechanisms is smaller in width (narrower) than the dead zone for the other cam phase variable mechanism. Namely, dead zones may be used such that the cam phase variable mechanism to be preferentially controlled is associated with a narrower dead zone. Alternatively, the control preference may be implemented by advancing the control instruction timing of one of the two cam phase variable mechanisms which is to be preferentially controlled, as illustrated in FIG. 9.

Also in this case, the first and second cam phase variable mechanisms 30 and 31 can both be stably controlled with high precision.

What is claimed is:

1. A variable valve device for an internal combustion engine comprising;
    a first cam phase variable mechanism in which each cylinder includes a first intake valve driven by a first intake cam and a second intake valve driven by a second intake cam, the mechanism being capable of varying phases of both the first and second intake cams,
    a second cam phase variable mechanism capable of varying the phase of the second intake cam relative to that of the first intake cam, and
    a phase variable control unit that controls the first and second cam phase variable mechanisms, wherein:
    the phase variable control unit preferentially controls the second cam phase variable mechanism when the engine is operating in a low-speed, low-load region in which the rotating speed is lower than a predetermined rotating speed and also the load is lower than a predetermined load, and preferentially controls the first cam phase variable mechanism based on the required engine load and maintains the second cam phase variable mechanism at a second predetermined phase when the engine is operating in a high-load region in which the load is higher than or equal to the predetermined load,
    wherein the phase variable control unit includes:
    target value setting unit that sets a control target value for each of the first and second cam phase variable mechanisms; and
    dead zone setting unit that sets a dead zone with respect to each of the control target values set by the target value setting unit, and
    wherein the dead zone setting unit sets the dead zones such that the dead zone associated with one of the first and second cam phase variable mechanisms which is to be preferentially controlled is narrower than the dead zone associated with the other of the first and second cam phase variable mechanisms.

2. The variable valve device according to claim 1, wherein the phase variable control unit stops preferentially controlling the second cam phase variable mechanism when the engine is operating in a high-speed region in which the rotating speed is higher than or equal to the predetermined rotating speed.

3. The variable valve device according to claim 1, wherein the phase variable control unit advances control start timing of one of the first and second cam phase variable mechanisms which is to be preferentially controlled over the other.

* * * * *